United States Patent
Bauldock, Sr.

(10) Patent No.: US 6,941,667 B2
(45) Date of Patent: Sep. 13, 2005

(54) TEACHING SIN AND COSINE INSTRUMENT

(75) Inventor: Gerald Bauldock, Sr., 16 Meadowbrook Pl., Willingboro, NJ (US) 08046

(73) Assignee: Gerald Bauldock, Sr., Willingboro, NJ (US)

( * ) Notice: Subject to any disclaimer, the term of this patent is extended or adjusted under 35 U.S.C. 154(b) by 0 days.

(21) Appl. No.: 10/707,091

(22) Filed: Nov. 20, 2003

(65) Prior Publication Data
US 2005/0108885 A1   May 26, 2005

(51) Int. Cl.$^7$ ............................. G09B 23/04; B43L 7/12
(52) U.S. Cl. ............................. 33/472; 33/453; 434/211
(58) Field of Search ....................... 33/472, 453, 419, 33/420, 421, 424, 425, 426, 452, 471; 434/211, 434/212, 215

(56) References Cited

U.S. PATENT DOCUMENTS

| | | | | | |
|---|---|---|---|---|---|
| 3,413 | A | * | 1/1844 | Thompson | 33/424 |
| 102,034 | A | * | 4/1870 | Ockerlund | 33/274 |
| 115,318 | A | * | 5/1871 | Hickman | 33/426 |
| 662,977 | A | * | 12/1900 | Schmelz | 33/453 |
| 771,663 | A | * | 10/1904 | Peroy | 33/273 |
| 964,246 | A | * | 7/1910 | Hagan, Sr. | 33/472 |
| 1,117,805 | A | * | 11/1914 | De L'Leau | 33/453 |
| 1,379,124 | A | * | 5/1921 | Read | 33/472 |
| 1,409,342 | A | * | 3/1922 | Henrichs | 33/472 |
| 1,500,427 | A | * | 7/1924 | Valkenburgh | 33/471 |
| 1,691,279 | A | * | 11/1928 | Gates | 33/472 |
| 1,955,392 | A | * | 4/1934 | Shimberg | 33/453 |
| 1,999,105 | A | * | 4/1935 | Milla | 33/453 |
| 2,160,820 | A | * | 6/1939 | Bensen | 33/453 |
| 2,505,149 | A | * | 4/1950 | Schoenberg | 33/453 |
| 2,682,367 | A | * | 6/1954 | Friesen | 235/61 T |
| 2,990,620 | A | * | 7/1961 | Tagliere | 33/453 |
| 3,345,752 | A | * | 10/1967 | Gabriel | 33/456 |

* cited by examiner

Primary Examiner—R. Alexander Smith

(57) ABSTRACT

A device that teaches the relationship between a right triangle, the length of its hypotenuse, the length of its two sides and the trigonometric functions. The device includes a horizontal and vertical ruler attached by a sliding attachment bracket. A circular plate showing 360 degrees ($\theta$) is attached to the horizontal ruler along with a pivoting ruler that can rotate 360 degrees. By sliding the vertical ruler along the horizontal ruler and revolving the pivoting ruler, the height of the vertical ruler (Y) where it intersects the pivoting ruler, the length of the horizontal ruler (X) where it intersects the vertical ruler, and the length of the of the pivoting ruler (R) where it intersects the vertical ruler can be measured. The trigonometric functions can then be calculated and plotted by their relationship with the measured values of X, Y, R and $\theta$.

3 Claims, 2 Drawing Sheets

TEACHING SIN AND COSINE INSTRUMENT

BACKGROUND OF INVENTION

1) Field of the Invention

The invention relates to devices, which provides a teaching method for geometric concepts relating to a right triangle and the relationships that exist between its hypotenuse (R), the length of its two sides (X and Y) and the trigonometric functions.

Across the nation, schools are going through a major reform in their math and science curriculum to bring education standards up to par. The facts show that there is an achievement gap between various individuals and groups in mathematics and science as indicated in 1999, when the latest National Assessment of Education Progress (NAEP) test was administered. The partnerships between government agency, industry, academia and private organizations are trying to address these issues along with many others. This invention provides a method for teaching the geometric concepts of a right triangle and trigonometric functions.

2) Prior Art

The prior art consist of teaching the theory and equations for the geometry of a right triangle, its sides, angles and the relationship between the trigonometric functions. Lessons primarily consist of mathematical explanations and graphs of the trigonometric functions. Equations such as $Y = R \sin \theta$ or $X = R \cosine \theta$ along with other trigonometric functions can be graphed and thus generate the resulting curves for each function.

The present invention, as distinguished from the prior art, provides a device that clearly demonstrates the relationship between a right triangle, its sides, angles, and trigonometric function. None of the prior art uses a device or tool that includes a horizontal and vertical ruler attached by a sliding attachment bracket along with a circular plate showing 360 degrees of the circle attached to the horizontal ruler along with a pivoting ruler that can rotate 360 degrees around the circular plate.

SUMMARY OF INVENTION

The present invention is designed to teach the relationship between a right triangle, the length of its hypotenuse (R), the length of its two sides (X and Y) and the trigonometric functions.

One of the objectives of the present invention is to provide a device that will bring the level of learning and understanding of a right triangle and the trigonometric function to a conceptual level rather than just a fact remembering level as described in the Blooms Taxonomy.

Another objective is to clearly show how the cosine function is related to X/R, (the x axis/the hypotenuse).

Another objective is to clearly show how the sine function is related to Y/R, (the y axis/the hypotenuse).

Another objective is to clearly show the remaining trigonometric functions (tangent, cotangent, secant, and cosecant) and their ratios to X, Y or R as defined for the sine and cosine functions above.

Another objective is to use the invention to generate graphs of the trigonometric function using data collected from measurements of the lengths of the rulers at their intersections and the angle.

DETAILED DESCRIPTION

The present invention is designed to teach the relationship between a right triangle, the length of its hypotenuse (R), the length of its two sides (X and Y) and the trigonometric functions.

Figure 1:
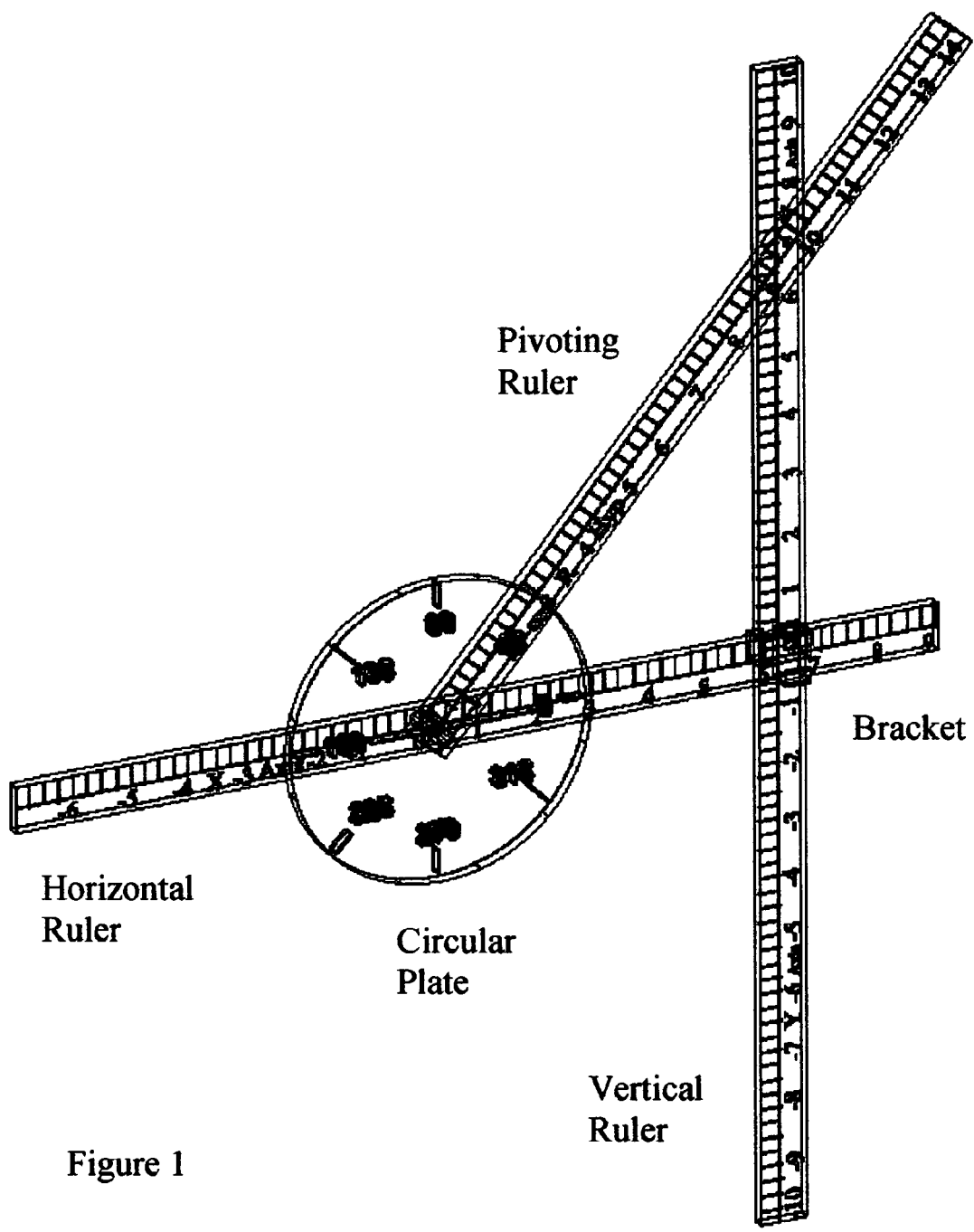
FIG. 1 is an off angled view of the invention.
Figure 2:
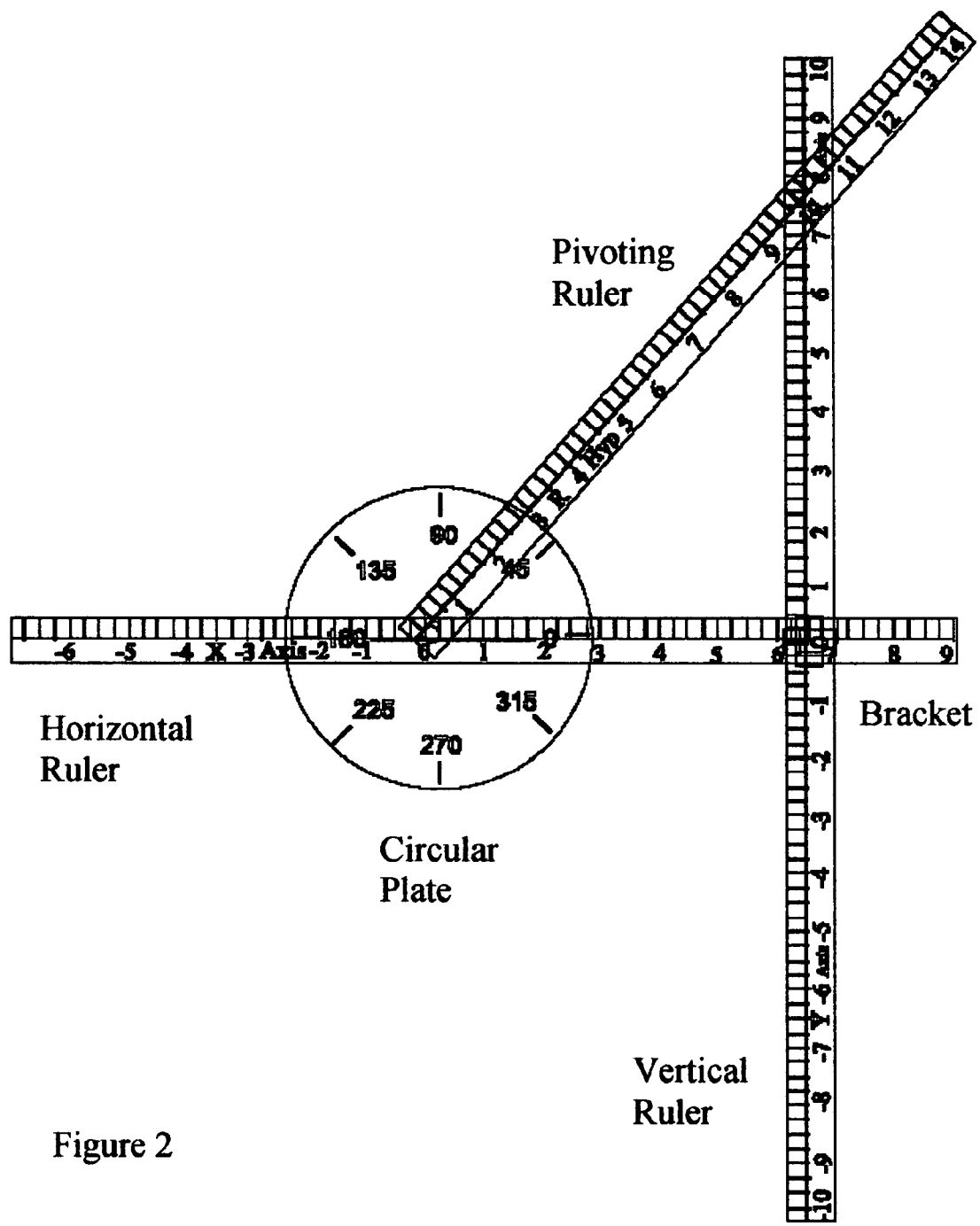
FIG. 2 is a front view of the invention.

Referring to FIG. 1, the device includes a horizontal ruler, a vertical ruler, a pivoting ruler and a circular plate. The horizontal ruler having a left portion with measuring indicia and a right portion with measuring indicia, and the vertical ruler having an upper portion with measuring indicia and a lower portion with measuring indicia. The vertical ruler being attached by a sliding attachment bracket to the horizontal ruler such that the vertical ruler can be slidably positioned anywhere along the length of the horizontal ruler and to maintain the vertical ruler at a right angle. The sliding attachment bracket is located at the intersection of the upper and lower portions of the vertical ruler. The pivoting ruler includes an end attached to a pivoting point on the horizontal ruler such that the pivoting ruler can rotate 360 degrees. The pivoting point is located at the intersection of the left and right portions of the horizontal ruler and a circular plate showing 360 degrees of the circle is also attached to the horizontal ruler at the pivoting point so that the pivoting ruler can rotate 360 degrees around the circular plate. FIG. 1 shows the measuring indicia of the lower and upper portions of the vertical ruler including negative and positive numbers, respectively, and the measuring indicia of the left and right portions of the horizontal ruler including negative and positive numbers, respectively.

Classroom activities can be developed using the present invention that will increase the level of understanding of the trigonometric functions. One such activity involves leaving the pivoting ruler at a constant angle (e.g. 30 degrees). Slide the vertical ruler to different positions along the horizontal ruler. This allows the right triangle that is formed by the pivoting ruler, the vertical ruler and the horizontal ruler to change in size while keeping the length of each ruler proportional to each other. Measure the length of the pivoting ruler (R), the horizontal ruler (X) and the vertical rulers (Y) for each position that the vertical ruler is moved to on the horizontal ruler. Calculate the ratio of X/R and Y/R for the different positions. Remember that the angle is kept constant. Students will find that the ratios X/R and Y/R will also remain constant even though the vertical ruler is moved to different positions on the horizontal ruler. The students learn that the cosine $\theta(X/R)$ and the sin $\theta(Y/R)$ will remain constant as long as the proportions of the right triangle are the same. The same method can be used for the other trigonometric functions. The present invention allows a more comprehensive understanding of the concepts of the trigonometric functions.

Another classroom activity involves moving the pivoting ruler to different angles. For example, starting at 0 degrees, move the pivoting ruler to different angles at increments of 15 degrees. The pivoting ruler can move all the way around the circle 360 degrees. Move the vertical ruler so that it is always intercepting the pivoting ruler. Measure the lengths of the rulers (X, Y, and R) for each angle $\theta$. When the pivoting ruler is in the first quadrant, X and Y will have positive values. When the pivoting ruler is in the second quadrant, X will have a negative value and Y will have a positive value. When the pivoting ruler is in the third quadrant, X and Y will have negative values. When the pivoting ruler is in the fourth quadrant, X will have a positive value and Y will have a negative value. R will always have a positive value no matter what quadrant the pivoting ruler is in. And it doesn't matter how big the triangle is as was learned in the previous activity because the ratio will stay constant for a given θ. Calculate the values for X/R and Y/R for each angle θ. Make a plot of θ vs. X/R and θ vs. Y/R. X/R and Y/R will be located on the y axis and θ will be on the x axis. The results of the plots will be the cosine curve and the sin curve. Participating in this activity with the present invention allows a more comprehensive understanding of the concepts of the trigonometric functions.

I claim:

1. A device for demonstrating the relationship between a right triangle, its sides, angles, and trigonometric functions, said device comprising:
   a horizontal ruler having a left portion with measuring indicia and a right portion with measuring indicia, a circular plate showing 360 degrees of the circle being attached to the horizontal ruler at an intersection of said left and right portions of said horizontal ruler;
   a vertical ruler having an upper portion with measuring indicia and a lower portion with measuring indicia, a sliding attachment bracket being attached to the vertical ruler at an intersection of the upper and lower portions, said sliding attachment maintaining said vertical ruler at a right angle to said horizontal ruler and allows said vertical ruler to be slidably moved to said left and right portions of said horizontal ruler;
   a pivoting ruler having measuring indicia and an end rotatably attached at said intersection of said horizontal ruler such that the pivoting ruler can rotate 360 degrees;
   wherein said pivoting ruler can rotate to different angles using a set increment of degrees all the way around the circle and wherein said vertical ruler can be moved to intersect the pivoting ruler at a location along said pivoting ruler other than at said end of said pivoting ruler.

2. The device of claim 1, wherein
   said measuring indicia of said left portion of said horizontal ruler comprise negative numbers and wherein said measuring indicia of said right portion of said horizontal ruler comprise positive numbers, and wherein
   said measuring indicia of said lower portion of said vertical ruler comprise negative numbers and wherein said measuring indicia of said upper portion of said vertical ruler comprise positive numbers.

3. The device of claim 1, wherein said device is adapted to allow data to be collected which can be used to plot curves for trigonometric functions.

* * * * *